United States Patent
Shukla et al.

(10) Patent No.: US 9,608,939 B2
(45) Date of Patent: Mar. 28, 2017

(54) METHODS AND APPARATUS TO REDUCE FORWARDING STATE ON AN FCOE-TO-FC GATEWAY USING PORT-SPECIFIC MAC ADDRESSES

(75) Inventors: Amit Shukla, Sunnyvale, CA (US); Suresh Boddapati, Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1103 days.

(21) Appl. No.: 12/976,208

(22) Filed: Dec. 22, 2010

(65) Prior Publication Data

US 2012/0163174 A1  Jun. 28, 2012

(51) Int. Cl.
*H04L 12/66* (2006.01)
*H04L 12/803* (2013.01)
*H04L 12/935* (2013.01)
*H04L 12/931* (2013.01)

(52) U.S. Cl.
CPC .......... *H04L 49/505* (2013.01); *H04L 49/357* (2013.01)

(58) Field of Classification Search
CPC ............... H04L 12/66; H04L 29/06068; H04L 29/06224; H04L 65/102; H04L 69/08; H04L 49/357; H04L 61/6045
USPC .................................. 370/229, 235, 388, 401
See application file for complete search history.

(56) References Cited

U.S. PATENT DOCUMENTS

| | | | |
|---|---|---|---|
| 5,970,066 A | 10/1999 | Lowry et al. | |
| 6,556,541 B1 | 4/2003 | Bare | |
| 7,430,164 B2 | 9/2008 | Bare | |
| 7,564,869 B2 | 7/2009 | Cafiero et al. | |
| 7,924,805 B2 | 4/2011 | Nishibayashi et al. | |
| 8,018,943 B1 | 9/2011 | Pleshek et al. | |
| 8,098,677 B1 | 1/2012 | Pleshek et al. | |
| 8,160,094 B2 | 4/2012 | Cafiero et al. | |
| 8,238,347 B2 | 8/2012 | DeSanti et al. | |
| 8,248,930 B2 | 8/2012 | Felderman et al. | |
| 8,284,785 B2 | 10/2012 | Hirata | |
| 8,307,153 B2 | 11/2012 | Kishore | |
| 8,321,908 B2 | 11/2012 | Gai et al. | |
| 8,351,442 B1 | 1/2013 | McGlaughlin | |
| 8,369,347 B2 | 2/2013 | Xiong et al. | |
| 8,391,300 B1* | 3/2013 | Dropps et al. | 370/401 |
| 8,422,359 B2 | 4/2013 | Nakajima | |
| 2002/0038339 A1 | 3/2002 | Xu | |
| 2002/0163884 A1* | 11/2002 | Peles et al. | 370/229 |

(Continued)

OTHER PUBLICATIONS

Office Action for U.S. Appl. No. 12/976,212 mailed Aug. 1, 2013.

(Continued)

*Primary Examiner* — Scott M Sciacca (74) *Attorney, Agent, or Firm* — Cooley LLP (57) ABSTRACT

In one embodiment, an apparatus includes an initialization module configured to receive a Fiber Channel over Ethernet Initialization Protocol (FIP) login request from a network device. The initialization module is configured to select an outbound port based at least in part on a load-balancing calculation. The initialization module is configured to define a destination Media Access Control (MAC) address. The initialization module is configured to associate the destination MAC address with the outbound port. The initialization module is configured to send, to the network device, a signal including the destination MAC address in response to the FIP login request.

20 Claims, 5 Drawing Sheets

(56) References Cited

U.S. PATENT DOCUMENTS

| | | |
|---|---|---|
| 2003/0142685 A1 | 7/2003 | Bare |
| 2003/0179707 A1 | 9/2003 | Bare |
| 2003/0217319 A1 | 11/2003 | Tripathi et al. |
| 2003/0223413 A1* | 12/2003 | Guerrero ............... 370/389 |
| 2004/0103275 A1 | 5/2004 | Ji et al. |
| 2005/0125692 A1 | 6/2005 | Cox et al. |
| 2005/0152305 A1 | 7/2005 | Ji et al. |
| 2005/0165949 A1 | 7/2005 | Teague |
| 2005/0238016 A1 | 10/2005 | Nishibayashi et al. |
| 2005/0238353 A1* | 10/2005 | McGlaughlin ........ H04L 49/357 398/45 |
| 2006/0098681 A1 | 5/2006 | Cafiero et al. |
| 2006/0146705 A1 | 7/2006 | Waxman |
| 2006/0203721 A1 | 9/2006 | Hsieh et al. |
| 2006/0251067 A1* | 11/2006 | DeSanti et al. ............... 370/389 |
| 2007/0097927 A1 | 5/2007 | Gorokhov et al. |
| 2007/0239944 A1* | 10/2007 | Rupanagunta ........ G06F 3/0613 711/147 |
| 2008/0056300 A1 | 3/2008 | Williams |
| 2008/0095109 A1 | 4/2008 | Malladi et al. |
| 2008/0232338 A1 | 9/2008 | Ji et al. |
| 2009/0003361 A1 | 1/2009 | Bakthavathsalam |
| 2009/0037977 A1* | 2/2009 | Gai et al. ............... 726/1 |
| 2009/0041046 A1 | 2/2009 | Hirata |
| 2009/0052345 A1 | 2/2009 | Brown et al. |
| 2009/0052346 A1 | 2/2009 | Brown et al. |
| 2009/0052461 A1 | 2/2009 | Brown et al. |
| 2009/0245791 A1 | 10/2009 | Thaler et al. |
| 2009/0252181 A1 | 10/2009 | Desanti |
| 2009/0254677 A1 | 10/2009 | Desanti |
| 2009/0268612 A1 | 10/2009 | Felderman et al. |
| 2009/0296726 A1 | 12/2009 | Snively et al. |
| 2010/0017497 A1* | 1/2010 | Brown et al. ............... 709/217 |
| 2010/0115132 A1* | 5/2010 | Hirata et al. ............... 709/245 |
| 2010/0165994 A1 | 7/2010 | Narayanaswamy et al. |
| 2010/0183024 A1 | 7/2010 | Gupta |
| 2010/0214950 A1 | 8/2010 | Vobbilisetty |
| 2010/0232419 A1* | 9/2010 | Rivers ............... 370/352 |
| 2011/0022691 A1 | 1/2011 | Banerjee et al. |
| 2011/0044344 A1* | 2/2011 | Hudson et al. ........ 370/395.53 |
| 2011/0051733 A1* | 3/2011 | Hirata ............... 370/400 |
| 2011/0064086 A1* | 3/2011 | Xiong et al. ............... 370/401 |
| 2011/0110241 A1 | 5/2011 | Atkinson et al. |
| 2011/0135303 A1* | 6/2011 | Hufferd ............... 398/45 |
| 2011/0255540 A1 | 10/2011 | Mizrahi et al. |
| 2011/0280255 A1* | 11/2011 | DeSanti ............... 370/419 |
| 2011/0299413 A1 | 12/2011 | Chatwani et al. |
| 2012/0134672 A1 | 5/2012 | Banerjee |
| 2012/0163395 A1 | 6/2012 | Shukla et al. |

OTHER PUBLICATIONS

Office Action for U.S. Appl. No. 12/976,212 mailed Feb. 13, 2014.

Office Action for U.S. Appl. No. 12/976,212 mailed Jun. 5, 2014.

* cited by examiner

METHODS AND APPARATUS TO REDUCE FORWARDING STATE ON AN FCOE-TO-FC GATEWAY USING PORT-SPECIFIC MAC ADDRESSES

CROSS-REFERENCE TO RELATED APPLICATIONS

This application is related to U.S. patent application Ser. No. 12/976,212, entitled "Methods and Apparatus to Route Fibre Channel Frames Using Reduced Forwarding State on an FCoE-to-FC Gateway," filed on even date herewith, the disclosure of which is incorporated herein by reference in its entirety.

BACKGROUND

Some embodiments described herein relate generally to network routing, and more particularly to switching policies for improved Fibre Channel over Ethernet (FCoE) network switching and/or routing.

Many modern networks include hardware devices and/or software (executing in hardware) configured to transfer data frames according to one or both of the Ethernet and Fibre Channel networking standards. To allow for interoperability between Ethernet and Fibre Channel resources, these networks often employ a third network protocol known as Fibre Channel over Ethernet ("FCoE"). By encapsulating Fibre Channel frames within an FCoE frame, a network device such as an FCoE-to-Fibre Channel gateway ("FCoE gateway") can route and/or switch Fibre Channel frames from one Fibre Channel device to another over an Ethernet network.

FCoE gateways thus are typically capable of: (1) relaying, to a Fibre Channel device (such as a switch), a Fibre Channel frame extracted from within an FCoE frame, and (2) encapsulating a received Fibre Channel frame within an FCoE frame that can be forwarded, via an Ethernet network, to another Fibre Channel device (such as a Fibre Channel peripheral processing device). As part of its switching and.or routing responsibilities, many FCoE gateways adhere to one or more switching policies, rules or filters that dictate specific switching behavior. Many filters dictate, for example, whether an FCoE gateway should deliver, drop, or re-route a received frame based on the frame's type, format, and/or contents. Some switching policies can dictate other aspects of data-switching behavior, such as a specified delay time, use of a specified communication port for certain data types, etc.

While such filters and/or switching policies allow for more intelligent switching, storage space for these rules is sometimes limited due to scale and cost constraints. More particularly, when an FCoE gateway assigns a distinct switching policy for each pairing of a virtual port of a peripheral device and an outbound port of the FCoE gateway (to enable data transmission from the virtual port to a switch), the presence of a switching policy for each virtual port/outbound port pair can result in an inefficient use of storage space.

Thus, a need exists for methods and apparatus to reduce or minimize the number of switching policies used to route and/or direct FCoE frames from peripheral devices to Fibre Channel switches, and thereby reduce storage space concerns. A need further exists for methods and apparatus to define a destination MAC address associated with a port instantiated at a peripheral device and an outbound port of a gateway device and/or switch, thereby reducing the number of switching policies used to route and/or direct FCoE frames from a given peripheral device to a Fibre Channel switch. A need further exists for methods and apparatus to define a mapping between the port instantiated at the peripheral device and an egress (outbound) port instantiated at the gateway device and/or switch.

SUMMARY

In one embodiment, an apparatus includes an initialization module configured to receive a Fibre Channel over Ethernet Initialization Protocol (FIP) login request from a network device. The initialization module is configured to select an outbound port based at least in part on a load-balancing calculation. The initialization module is configured to define a destination Media Access Control (MAC) address. The initialization module is configured to associate the destination MAC address with the outbound port. The initialization module is configured to send, to the network device, a signal including the destination MAC address in response to the FIP login request.

DETAILED DESCRIPTION

In some embodiments, an FCoE-to-Fibre Channel gateway ("FCoE gateway") can be coupled to one or more Fibre Channel peripheral processing devices and one or more Ethernet ports. The FCoE gateway can also be coupled to a Fibre Channel switch via one or more Fibre Channel ports. The Fibre Channel switch can include one or more virtual Fibre Channel F ports, and can be further operatively and/or physically coupled to a Fibre Channel network. Each of the peripheral processing devices can be physically and/or operatively coupled to the FCoE gateway via one or more Ethernet ports. Any or all of the peripheral processing devices can include one or more virtual Fibre Channel N ports, each virtual Fibre Channel N port being uniquely and operatively coupled to a distinct virtual Fibre Channel F port instantiated at the Fibre Channel switch.

The FCoE gateway can receive a Fibre Channel over Ethernet Initialization Protocol (FIP) request from one of the virtual Fibre Channel N ports instantiated at one of the Fibre Chanel peripheral processing devices. The FCoE gateway can next select an outbound port (e.g., an egress Ethernet port, an egress FCoE port, or an egress Fibre Channel port). In some embodiments, the selected outbound port can receive FCoE frames and/or Fibre Channel frames, and send, to a compatible device, one or more received FCoE frames and/or Fibre Channel frames encapsulated within received FCoE frames. The compatible device can be, for example, a Fibre Channel switch having one or more ingress Ethernet ports, ingress FCoE ports and/or ingress Fibre Channel ports. In some embodiments, the compatible device can be one or more devices, each configured to receive FCoE frames and/or Fibre Channel frames from the selected outbound port of the FCoE gateway. In some embodiments, the FCoE gateway can select the outbound port based on one or more load-balancing calculations. For example, the FCoE gateway can select the outbound port based on historical and/or predicted network traffic data.

The FCoE gateway can next define a Fibre Channel login request based on the FIP request, and send a signal including the Fibre Channel login request to the Fibre Channel switch (via the selected outbound port). The FCoE gateway can alternatively send a signal to the Fibre Channel switch including a request for a Fibre Channel Identifier (FCID) for the virtual Fibre Channel N port. In some embodiments, the Fibre Channel switch can assign an FCID to the virtual Fibre Channel N port. Having defined the assigned FCID for the virtual Fibre Channel N Port, the Fibre Channel switch can send a signal including the assigned FCID to the FCoE gateway.

Upon receipt of the signal including the assigned FCID, the FCoE gateway can define and assign a MAC address to the virtual Fibre Channel N port. For purposes of sending FCoE frames to the FCoE gateway and/or the Fibre Channel switch, the assigned MAC address can be considered a source MAC address. After defining the assigned MAC address, the FCoE gateway can define a destination MAC address associated with the selected outbound port. The destination MAC address can be, for example, 48 bits in length, and can optionally include a 24-bit Organizationally Unique Identifier (OUI) associated with the Fibre Channel switch. The FCoE gateway can define a switching policy or forwarding rule associating the selected outbound port and the destination MAC address. The switching policy or forwarding rule can allow that when an Ethernet port of the FCoE gateway receives an FCoE frame including the destination MAC address, that FCoE frame (and/or a Fibre Channel frame encapsulated therein) is forwarded to the selected outbound port. The selected outbound port can then send, to the Fibre Channel switch, the entire FCoE frame and/or the encapsulated Fibre Channel frame.

Having selected the outbound port and defined the destination MAC address, the FCoE gateway can next send, to the virtual Fibre Channel N port, a signal including the destination MAC address. The destination MAC address can be defined and included in the signal such that all FCoE traffic originating from the virtual Fibre Channel N port includes the defined destination MAC address as the destination MAC address of the FCoE frame. In some embodiments, the FCoE gateway can send the signal to the virtual Fibre Channel N port (over, e.g., an Ethernet network) via the peripheral processing device at which the virtual Fibre Channel N port is instantiated. In some embodiments, the signal can include the assigned (source) MAC address and/or the assigned FCID associated with the virtual Fibre Channel N port (as defined by the FCoE gateway and/or Fibre Channel switch above). In some embodiments, the signal can be, or can be substantially similar to, an FIP response signal.

Figure 1:
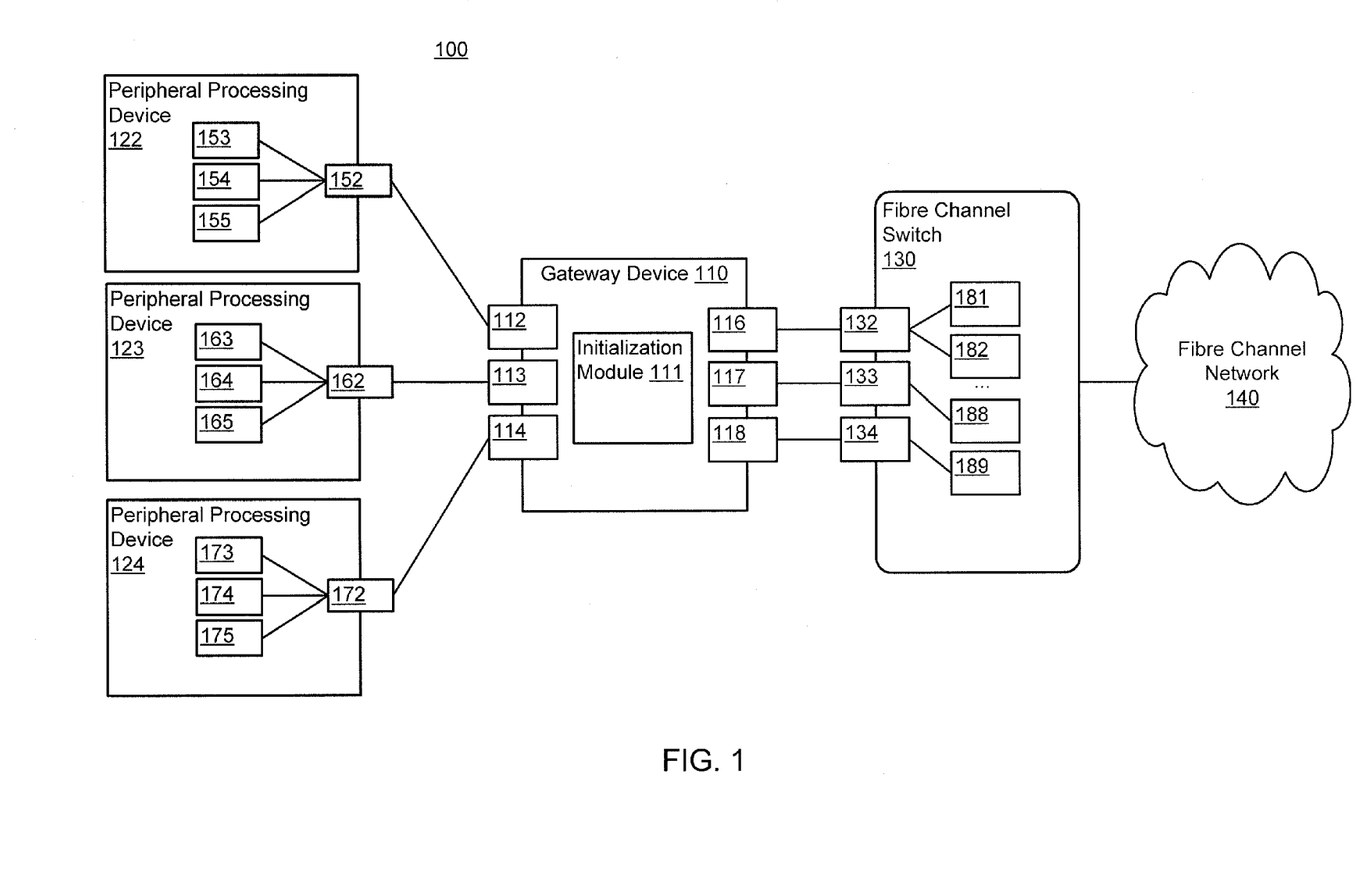
FIG. 1 is a schematic illustration of a mixed Ethernet and Fibre Channel portion of a network, according to an embodiment.

FIG. 1 is a schematic illustration of a mixed Ethernet and Fibre Channel portion of a network, according to an embodiment. More specifically, FIG. 1 illustrates a Network Portion 100 that includes a Gateway Device 110 physically and/or operatively coupled to Peripheral Processing Devices 122-124 (via Ethernet Ports 112-114) and a Fibre Channel Switch 130 (via Fibre Channel Ports 116-118). The Fibre Channel Switch 130 is operatively and/or physically coupled to the Gateway Device 110 via the Fibre Channel Ports 132-134 and to a Fibre Channel Network 140. The Fibre Channel Switch 130 includes a set of Virtual Fibre Channel F Ports 181-189, and each of the Virtual Fibre Channel F Ports 181-189 is associated with at least one of the Fibre Channel Ports 132-134.

Although not shown in FIG. 1, in some embodiments, any of the Fibre Channel Ports 132-134 can be associated with any of the Virtual Fibre Channel F Ports 181-189 at any given time. In some embodiments, any of the Fibre Channel Ports 132-134 can be associated with one or more Virtual Fibre Channel F Ports from the Virtual Fibre Channel F Ports 181-189 at a first time and one or more other Virtual Fibre Channel F Ports from the Virtual Fibre Channel F Ports 181-189 at a second time. For example, although shown in FIG. 1 as being associated with the Virtual Fibre Channel F Ports 181 and 182, the Fibre Channel Port 132 can be operatively coupled to any of the Virtual Fibre Channel F Ports 181-189. In this example, the Fibre Channel Port 132 can be associated with the Virtual Fibre Channel F Ports 181 and 182 at a first time, and can be associated with, for example, at least the Virtual Fibre Channel F Port 188 at a second time.

The Peripheral Processing Devices 122-124 are operatively and/or physically coupled to the Gateway Device 110 via the FCoE Ports 152, 162 and 172, respectively, and the Ethernet Network 120. The FCoE Ports 152, 162 and 172 are operatively coupled to the Virtual Fibre Channel N Ports 153-155, 163-165 and 173-175, respectively. Each of the Virtual Fibre Channel N Ports 153-155, 163-165 and 173-175 is uniquely and operatively coupled to one of the Virtual Fibre Channel F Ports 181-189 instantiated at the Fibre Channel Switch 130.

The Network Portion 100 can include a combination of hardware and/or software (executing on hardware) configured to transmit data between any of the Peripheral Processing Devices 122-124 and the Fibre Channel Switch 130 and/or the Fibre Channel Network 140 via the Gateway Device 110. The Network Portion 100 can be, for example, a portion of a data center fabric, local area network (LAN), wide area network (WAN), storage area network (SAN), intranet, or the Internet.

The Gateway Device 110 can be, for example, an FCoE gateway. In some embodiments, the Gateway Device 110 can be configured to transmit data based at least in part on the Ethernet, Fibre Channel and/or FCoE network protocols via the Ethernet Ports 112-114 and/or the Fibre Channel Ports 116-118. In such embodiments, the Ethernet Ports 112-114 can be configured to send FCoE frames to and/or receive FCoE frames from the FCoE Ports 152, 162 and 172, respectively. In such embodiments, the Fibre Channel Ports 116-118 can be Fibre Channel ports configured to send Fibre Channel frames to and/or receive Fibre Channel frames from the Fibre Channel Switch 130. Although not shown in FIG. 1, in some embodiments, the Gateway Device 110 can be physically and/or operatively coupled to one or more Fibre Channel switches, similar to the Fiber Channel Switch 130. In some embodiments, the Gateway Device 110 can be physically and/or operatively coupled to one or more of the Peripheral Processing Devices 122-124 via a network, such as an Ethernet network.

As shown in FIG. 1, the Gateway Device 110 also includes an Initialization Module 111 configured to handle one or more Fibre Channel over Ethernet Initialization Protocol (FIP) requests received from one or more of the Virtual Fibre Channel N Ports 153-155, 163-165 and 173-175 via the Peripheral Processing Devices 122-124, respectively. The Initialization Module 111 can be configured to define a destination MAC address associated with a selected outbound port, such as a selected Fibre Channel port from the Fibre Channel Ports 116-118. The outbound port can alternatively be, for example, another Fibre Channel, Ethernet and/or FCoE port. The Initialization Module can be further configured to define a source MAC address associated with a requesting virtual Fibre Channel N port from the Virtual Fibre Channel N Ports 153-155, 163-165 and 173-175 and/or a mapping between the selected Fibre Channel port from the Fibre Channel Ports 116-118 and one of the Ethernet Ports 112-114. The selected Fibre Channel port from the Fibre Channel Ports 116-118 can be chosen based at least in part on a load-balancing calculation. The destination MAC address can be configured to indicate that a Fibre Channel frame encapsulated in an FCoE frame received at the Gateway Device 110 (via, e.g., a given Ethernet port from the Ethernet Ports 112-114) be transmitted to the Fibre Channel Switch 130 via the selected Fibre Channel port from the Fibre Channel Ports 116-118. In some embodiments, the Initialization Module 111 can be any hardware-based module and/or software-based module (executing in hardware) configured to (1) receive an FIP request from a virtual Fibre Channel N port, (2) select an outbound port based on a load-balancing calculation, (3) send a Fibre Channel login request based on the FIP request to the Fibre Channel Switch 130 via the selected outbound port, (4) receive, from the Fibre Channel Switch 130, an assigned Fibre Channel ID (FCID) associated with the virtual Fibre Channel N port, (5) define and assign a source MAC address to the virtual Fibre Channel N port in response to the FIP request, (6) define a destination MAC address associated with the selected outbound port and/or (7) send the destination MAC address, the assigned source MAC address and/or the assigned FCID to the virtual Fibre Channel N port.

In some embodiments, each of the Ethernet Ports 112-114 can be a physical Ethernet port configured to exchange data with one of the Peripheral Processing Devices 122, 123 and 124, respectively, via the FCoE Ports 152, 162 and 172, respectively. In some embodiments, one or more of the Ethernet Ports 112-114 can be configured to exchange data with any of the FCoE Ports 152, 162 and 172 via an Ethernet network, such as a local area network (LAN) and/or wide area network (WAN) (not shown in FIG. 1). Although not shown in FIG. 1, in some embodiments, each of the Ethernet Ports 112-114 can be physically coupled to one of multiple Ethernet Network Interface Cards (NICs) included in the Gateway Device 110.

As shown in FIG. 1, each of the Fibre Channel Ports 116-118 is uniquely coupled to one of the Fibre Channel Ports 132-134 of the Fibre Channel Switch 130. Although not shown in FIG. 1, in some embodiments, each of the Fibre Channel Ports 116-118 can be coupled to one or more of the Fibre Channel Ports 132-134 of the Fibre Channel Switch 130. In some embodiments, each of the Fibre Channel Ports 116-118 can be a physical Fibre Channel F port configured to allow exchange of one or more Fibre Channel frames between the Gateway Device 110 and the Fibre Channel Switch 130.

Although not shown in FIG. 1, the Gateway Device 110 can include one or more data structures indicating one or more switching policies, rules and/or filters. For example, in some embodiments, the Gateway Device 110 can include and/or be operatively coupled to a switching table and/or filter database (not shown in FIG. 1) used by the Gateway Device 110 when switching data frames to one or more of the Peripheral Processing Devices 122-124 and/or the Fibre Channel Switch 130. Accordingly, the Gateway Device 110 can serve as a gateway between the Peripheral Processing Devices 122-124 and the Fibre Channel Switch 130, allowing for the transmission of FCoE frames and/or encapsulated Fibre Channel frames from the Peripheral Processing Devices 122-124 to the Fibre Channel Switch 130 and/or the Fibre Channel Network 140, and for the transmission of Fibre Channel frames and/or FCoE frames encapsulating Fibre Channel frames from the Fibre Channel Switch 130 and/or the Fibre Channel Network 140 to any of the Peripheral Processing Devices 122-124.

Each of the Peripheral Processing Devices 122-124 can be any combination of hardware and/or software (executing in hardware) capable of transmitting information to and/or receiving information from the Gateway Device 110. In some embodiments, one or more of the above-described peripheral processing devices can be a server device, an application server, a database system, a storage device, gateway, workstation, a compute device and/or the like. Each of the Peripheral Processing Devices 122-124 can optionally be, for example, compute nodes, service nodes, routers, and/or storage nodes. In some embodiments, one or more of the Peripheral Processing Devices 122-124 can perform one or more computing tasks, such as one or more data storage, Software as a Service (SAS), web service, content request, or other computing tasks. In some embodiments, one or more of the Peripheral Processing Devices 122-124 can be a Fibre Channel-based device operatively and/or physically coupled to one or more other Fibre Channel-based devices, such as a Fibre Channel switch, a Fibre Channel fabric, a SAN, etc.

As shown in FIG. 1, the Peripheral Processing Devices 122-124 can include the FCoE Ports 152, 162 and 172, respectively, and the Virtual Fibre Channel N Ports 153-155, 163-165 and 173-175, respectively. In some embodiments, each of the Virtual Fibre Channel N Ports 153-155, 163-165 and 173-175 can be configured to send one or more Fibre Channel frames for encapsulation within an FCoE frame and subsequent transmission by the corresponding FCoE port from the FCoE Ports 152, 162 and 172. The appropriate FCoE port from the FCoE Ports 152, 162 and 172 can transmit the FCoE frame to the Gateway Device 110. Each of the Virtual Fibre Channel N Ports 153-155, 163-165 and 173-175 can also be configured to receive one or more Fibre Channel frames that have been extracted and/or decapsulated from one or more FCoE frames, each of the FCoE frames having been received by the corresponding FCoE port from the FCoE Ports 152, 162 and 172.

In some embodiments, the Peripheral Processing Devices 122-124 can be in communication with the Gateway Device 110 via any suitable connection such as, for example, an optical connection (e.g., an optical cable and optical connectors), an electrical connection (e.g., an electrical cable and electrical connectors) and/or the like. Similarly stated, each of the FCoE Ports 152, 162 and 172 can provide a communication interface through which a Peripheral Processing Device 122-124 can be operatively coupled to the Gateway Device 110.

As such, the Peripheral Processing Devices 122-124 are configured to send data (e.g., Ethernet frames, FCoE frames, data frames, data cells, etc.) to and receive data from the Gateway Device 110. In some embodiments, each connection between the Peripheral Processing Devices 122-124 and the Gateway Device 110 is a direct link. In other embodiments, the Peripheral Processing Devices 122-124 can be operatively coupled to the Gateway Device 110 via intermediate modules or devices.

In some embodiments, any combination of the Peripheral Processing Devices 122-124 can be physically located within the same physical chassis as one another and/or another one or more peripheral processing devices. In other embodiments, each of the Peripheral Processing Devices 122-124 can be located within a different chassis.

The FCoE ports 152, 162 and 172 can be physical Ethernet ports capable of sending and/or receiving one or more Ethernet and/or FCoE frames. In some embodiments, each of the FCoE ports 152, 162 and 172 can be associated with and/or located on a physical line card (not shown in FIG. 1), such as an Ethernet NIC. In some embodiments, each of the FCoE ports 152, 162 and 172 can include and/or be associated with a frame formatter module (not shown in FIG. 1) included at each of the Peripheral Processing Device 122-124, respectively. Each such frame formatter module can be configured to encapsulate Fibre Channel frames received from a virtual Fibre Channel N port within FCoE frames for transmission to the Gateway Device 110. In such embodiments, each such frame formatter module can be further configured to decapsulate and/or extract Fibre Channel frames from within FCoE frames received from the Gateway Device 110. In some embodiments, each of the FCoE Ports 152, 162 and 172 can alternatively be physically coupled to a Converged Network Adapter (CNA) included in the Peripheral Processing Devices 122-124, respectively, each such CNA being configured to send and/or receive traditional Ethernet and/or FCoE frames to and/or from the Gateway Device 110.

The Virtual Fibre Channel N Ports 153-155, 163-165 and 173-175 can be virtual Fibre Channel N ports similar to those generally associated with Fibre Channel and/or FCoE networks. In some embodiments, one or more of the Virtual Fibre Channel N Ports 153-155, 163-165 and 173-175 can constitute one of two virtual end nodes that define a virtual link. In such embodiments, each such Virtual Fibre Channel N Port can each be operatively coupled to a Virtual Fibre Channel F Port from the Virtual Fibre Channel F Ports 181-189 instantiated at the Fibre Channel Switch 130.

The Fibre Channel Switch 130 can be any combination of hardware and/or software (executing in hardware) configured to perform switching of Fibre Channel frames received from the Gateway Device 110. As shown in FIG. 1, the Fibre Channel Switch 130 is operatively coupled to the Gateway Device 110 and to the Fibre Channel Network 140, and can be configured to perform known switching tasks on Fibre Channel frames transmitted between the Gateway Device 110 and the Fibre Channel Network 140. As also shown in FIG. 1, the Fibre Channel Switch 130 includes Fibre Channel Ports 132-134, each of which is operatively and/or physically coupled to one of the Fibre Channel Ports 116-118 on the Gateway Device 110. In some embodiments, each of the Fibre Channel Ports 132-134 can be a Fibre Channel port configured to exchange one or more Fibre Channel frames with a single Fibre Channel port from the Fibre Channel Ports 116-118. Alternatively, each of the Fibre Channel Ports 132-134 can be configured to exchange one or more Fibre Channel and/or FCoE frames with one or more port of the Gateway Device 110, such as one or more of the Fibre Channel Ports 116-118. The Fibre Channel Switch 130 also includes the Virtual Fibre Channel F Ports 181-189. In some embodiments, each of the Virtual Fibre Channel F Ports 181-189 can be operatively coupled to one of the Virtual Fibre Channel N Ports 153-155, 163-165 and 173-175 instantiated at the Peripheral Processing Devices 122, 123 and 124, respectively. In such embodiments, each of the Virtual Fibre Channel F Ports 181-189 can exchange Fibre Channel frames with a single virtual Fibre Channel N port from the Virtual Fibre Channel N Ports 153-155, 163-165 and 173-175, thus defining a virtual link between those two virtual Fibre Channel ports.

The Virtual Fibre Channel F Ports 181-189 can be virtual Fibre Channel F ports similar to those generally associated with Fibre Channel and/or FCoE networks. In some embodiments, one or more of the Virtual Fibre Channel F Ports 181-189 can constitute one of two virtual end nodes that define a virtual link. For example, as described above, each such Virtual Fibre Channel F Port can be operatively uniquely associated with a Virtual Fibre Channel N Port from the Virtual Fibre Channel N Ports 153-155, 163-165 and 173-175, thus defining a virtual link.

In some embodiments, the Fibre Channel Switch 130 can comprise multiple physical devices. In some embodiments, the Fibre Channel Switch 130 can be or include a Fibre Channel Switch Fabric, such as a multi-stage Fibre Channel fabric. In such embodiments, the Fibre Channel Switch 130 can be included in, for example, a data center, and can be define one or more logical hierarchical elements, such as virtual data center fabrics (VDCFs) and/or virtual local area networks (VLANs).

The Fibre Channel Network 140 can be any combination of hardware devices and/or software modules (executing in hardware) that together comprise a Fibre Channel network. For example, although not shown in FIG. 1, the Fibre Channel Network 140 can include one or more Fibre Channel-compatible servers and/or peripheral devices connected to one or more Fibre Channel switching devices including one or more Host Bus Adapters (HBAs). In some embodiments, the Fibre Channel Network 140 can include one or more subnetwork portions, such as one or more Fibre Channel zones and/or storage area networks (SANs). As shown in FIG. 1, the Fibre Channel Network 140 can be operatively coupled to the Peripheral Processing Devices 122-124 via the Gateway Device 110 and the Fibre Channel Switch 130. In such embodiments, the Fibre Channel Network 140 can thus exchange data with the Peripheral Processing Devices 122-124.

Figure 2:
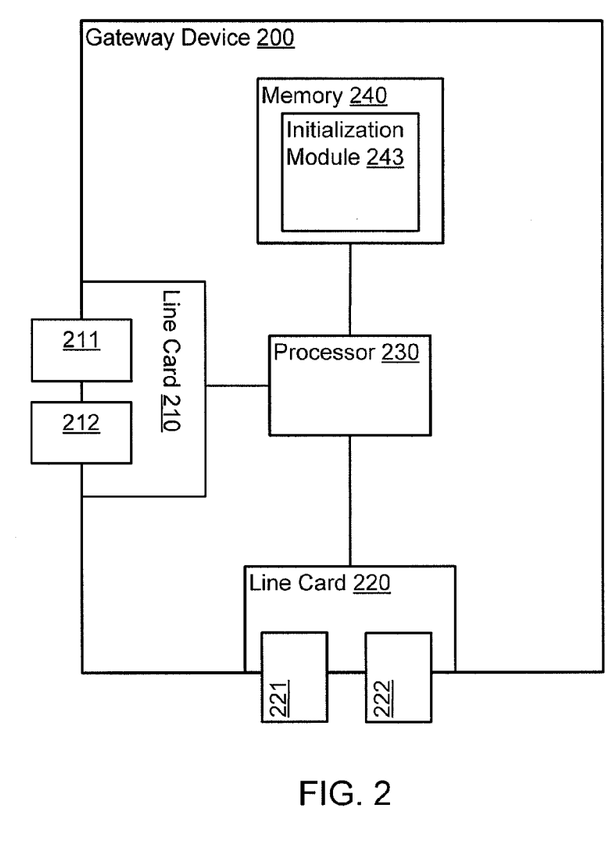
FIG. 2 is a schematic illustration of a gateway device of a mixed Fibre Channel/Ethernet network portion, according to another embodiment.

FIG. 2 is a schematic illustration of a gateway device of a mixed Fibre Chanel/Ethernet network portion, according to another embodiment. More specifically, FIG. 2 is a system block diagram of a Gateway Device 200, similar to the Gateway Device 110 described in connection with FIG. 1 above. The Gateway Device 200 includes a Processor 230, a Memory 240, a Line Card 210 and a Line Card 220. The Memory 240 includes an Initialization Module 243. The Line Card 210 includes the Physical Ports 211 and 212, and the Line Card 220 includes the Physical Ports 221 and 222. The Processor 230 is operatively coupled to the Memory 240, the Line Card 210 and the Line Card 220. In some embodiments, the Line Cards 210 and/or 220 include one or more processors and/or memories (not shown in FIG. 2).

Similar to the Ethernet Ports 112-114 of the Gateway Device 110 (shown in FIG. 1), the Physical Ports 211-212 and 221-222 can be configured to communicate with Ethernet and/or Fibre Channel peripheral processing devices, optionally via an Ethernet Network. Additionally or alternatively, similar to the Fibre Channel Ports 116-118 (shown in FIG. 1), the Physical Ports 211-222 and 221-222 can be configured to communicate with Fibre Channel devices, such as Fibre Channel switches. For example, the Physical Ports 211-212 and 221-222 can implement a physical layer using twisted-pair electrical signaling via electrical cables or fiber-optic signaling via fiber-optic cables. In some embodiments, some of the Physical Ports 211-212 and 221-222 can implement one physical layer such as twisted-pair electrical signaling, and others of the Physical Ports 211-212 and 221-222 can implement a different physical layer, such as fiber-optic signaling. Furthermore, the Physical Ports 211-212 and 221-222 can be configured to allow the Gateway Device 200 to communicate with peripheral processing devices and/or switching devices via a common protocol such as Ethernet, Fibre Channel and/or FCoE. In some embodiments, some of the Physical Ports 211-212 and 221-222 can implement one protocol such as Ethernet/FCoE and others of the Physical Ports 211-212 and 221-222 can implement a different protocol such as Fibre Channel. Thus, the Gateway Device 200 can be in communication with multiple peripheral processing and/or switching devices using homogeneous or heterogeneous physical layers and/or protocols via the Physical Ports 211-212 and 221-222.

In some embodiments, the Gateway Device 200 can be configured to define a destination MAC address associated with one of the Physical Ports 211-212 and 221-222, and send the destination MAC address to one or more peripheral processing devices (e.g., one of the Peripheral Processing Devices 122-124). For example, the Initialization Module 243 stored at the Memory 240 can be configured to (1) receive an FIP request from a peripheral processing device (e.g., one of the Peripheral Processing Devices 122-124), (2) select a physical port from the Physical Ports 211-212 and 221-222 based on a current and/or expected amount of network traffic being transmitted via each of the Physical Ports 211-212 and 221-222, (3) define a destination MAC address, (4) associate the destination MAC address with the selected physical port from the Physical Ports 211-212 and 221-222, and/or (5) send the destination MAC address to the peripheral processing device for use in transmitting FCoE frames and/or encapsulated Fibre Channel frames to a Fibre Channel switch via the Gateway Device 200.

In some embodiments, the Gateway Device 200 can be configured to prepare a data frame or packet (e.g., an Ethernet or FCoE frame and/or packet) for transmission to a peripheral processing device (e.g., one of the Peripheral Processing Devices 122-124) or a Fibre Channel device (e.g., the Fibre Channel Switch 130). For example, the Gateway Device 200 can be configured to forward, classify, and/or modify the frame encapsulation (e.g., modify, add and/or remove a header portion, footer portion and/or any other identifier included within the data frame) of a data frame prior to sending the data frame to a communications network, such as an Ethernet network. Additionally, the Gateway Device 200 can be configured to partition and/or divide the data frame into data cells (e.g., having fixed length payloads) prior to sending the data cells to the switch fabric. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, the Gateway Device 200 can be configured to define one or more filters, switching policies and/or rules that dictate how and to where data frames and/or packets are transmitted by the Gateway Device 200. For example, the Gateway Device 200 can be configured to define a switching policy, filter and/or rule specifying that all data frames received from a particular logical or physical address should in turn be sent to a device or module having a specified logical or physical address. Alternatively, the Gateway Device 200 can define a switching policy, filter and/or rule specifying that all data frames of a particular type (such as FCoE, Ethernet, or Fibre Channel) should be sent via one of a specified set of ports (such as one of the Fibre Channel Ports 116-118 shown in FIG. 1). In some embodiments, the Gateway Device 200 can be configured to route and/or send data frames and/or packets according to one or more filters. For example, the Gateway Device 200 can send or forward an FCoE frame to a specified peripheral processing device based at least in part on a filter.

Figure 3:
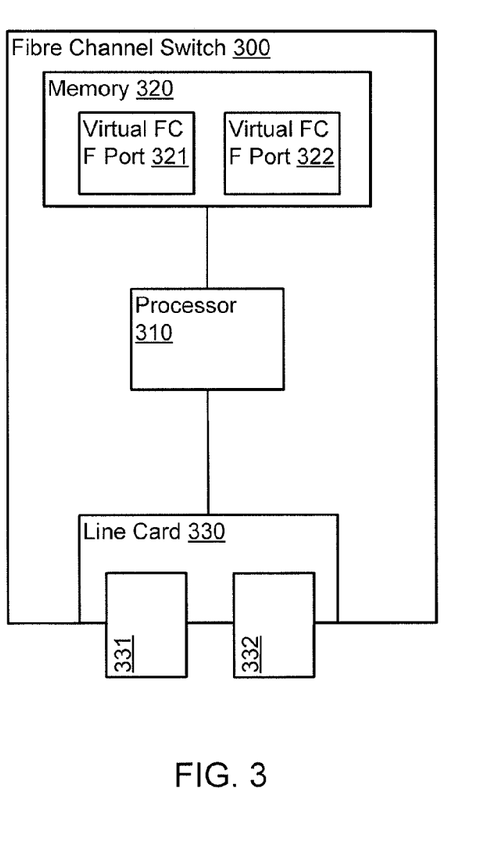
FIG. 3 is a schematic illustration of a Fibre Channel switch of a mixed Fibre Chanel/Ethernet network portion, according to another embodiment.

FIG. 3 is a schematic illustration of a Fibre Channel switch, according to another embodiment. More specifically, FIG. 3 is a system block diagram of a Fibre Channel Switch 300 substantially similar to the Fibre Channel Switch 130 described in connection with FIG. 1 above, according to an embodiment. The Fibre Channel Switch 300 includes a Processor 310, a Memory 320, and a Line Card 330. The Line Card 330 includes Fibre Channel Ports 331 and 332. The Processor 310 is operatively coupled to the Memory 320 and the Line Card 330. The Memory 320 includes Virtual Fibre Channel F Port 321 and Virtual Fibre Channel F Port 322. The Fibre Channel Switch 300 can communicate with other Fibre Channel devices, such as an FCoE gateway (similar to the Gateway Device 110 shown in FIG. 1), via the Fibre Channel Ports 331 and 332.

In some embodiments, the Fibre Channel Switch 300 can perform typical network switching functions on Fibre Channel frames. The Fibre Channel Switch 300 can, for example, receive a Fibre Channel frame from a gateway device and send that Fibre Channel frame to an appropriate next-hop device within a Fibre Channel network to which the Fibre Channel Switch 300 is coupled. In some embodiments, the Fibre Channel Switch 300 can communicate with one or more peripheral processing devices (e.g., one of the Peripheral Processing Devices 122-124) via the Virtual Fibre Channel F Port 321 and/or the Virtual Fibre Channel F Port 322. For example, the Fibre Channel Switch 300 can send a Fibre Channel frame from the Virtual Fibre Channel F Port 321 for ultimate transmission to a virtual Fibre Channel N port instantiated at a peripheral processing device (e.g., the Virtual Fibre Channel N Port 173 instantiated at the Peripheral Processing Device 124 in FIG. 1). In some embodiments, the Fibre Channel Switch 300 can receive an FIP request originally sent from a virtual Fibre Channel N port instantiated at a peripheral processing device and forwarded to the Fibre Channel Switch 300 by a gateway device (e.g., the Gateway Device 110). In such embodiments, the Fibre Channel Switch 300 can define a MAC address and/or an FCID for the virtual Fibre Channel N port, and send a signal including the assigned MAC address and/or FCID to the gateway device for forwarding to the virtual Fibre Channel N port.

Figure 4:
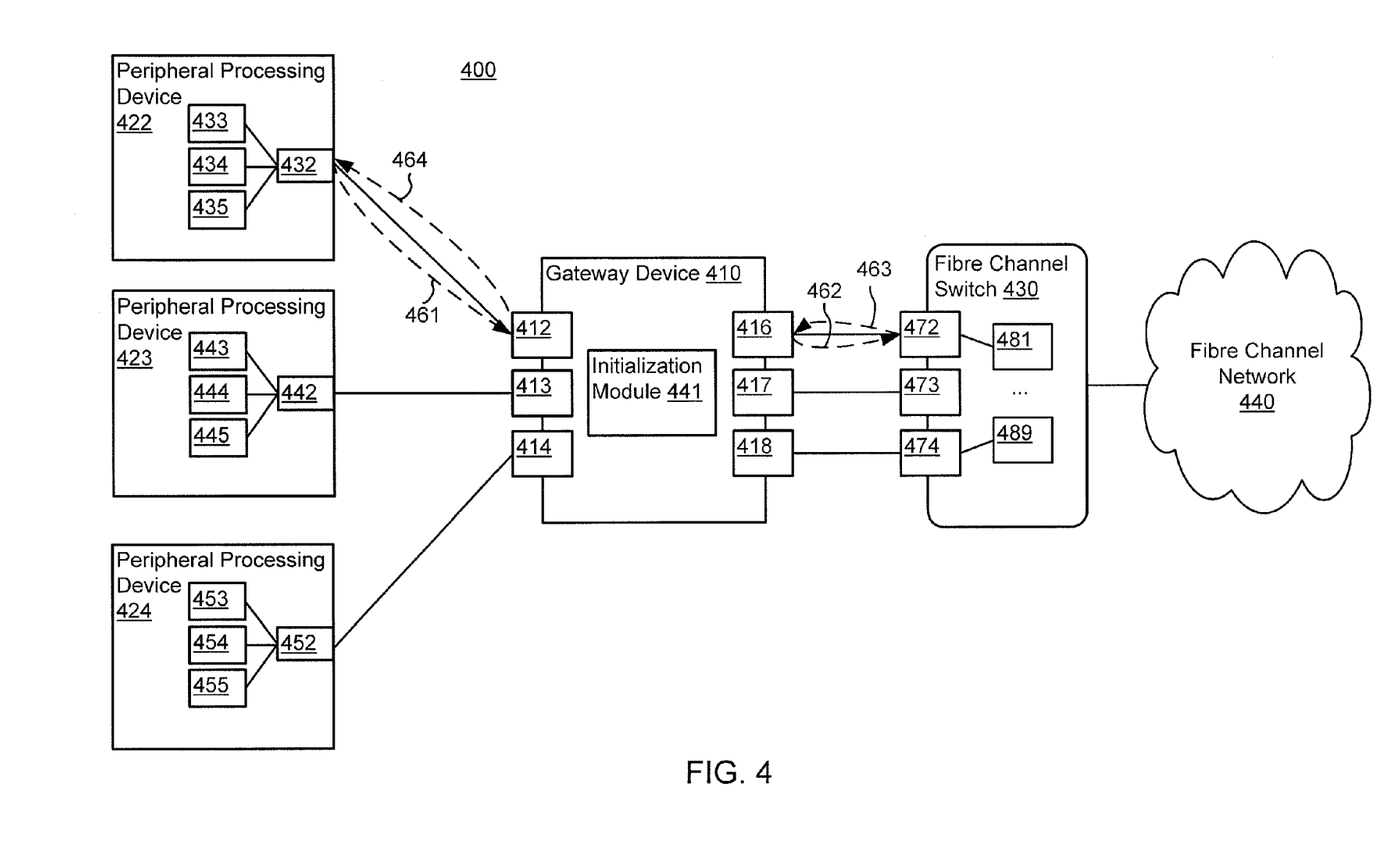
FIG. 4 is a schematic illustration of a mixed Ethernet/Fibre Channel network portion including a gateway device that sends, to a Fibre Channel end node, a destination Media Access Control (MAC) address associated with a Fibre Channel port, according to another embodiment.

FIG. 4 is a schematic illustration of a mixed Ethernet/Fibre Channel network portion including a gateway device that sends, to a Fibre Channel end node, a destination Media Access Control (MAC) address associated with a Fibre Channel port, according to another embodiment.

More specifically, FIG. 4 illustrates a Network Portion 400 that includes a Gateway Device 410 physically and/or operatively coupled to Peripheral Processing Devices 422-424 (via Ethernet Ports 412-414) and a Fibre Channel Switch 430 (via Fibre Channel Ports 416-418). The Fibre Channel Switch 430 is operatively and/or physically coupled to the Gateway Device 410 via the Fibre Channel Ports 472-474 and to a Fibre Channel Network 440. The Fibre Channel Switch 430 includes a set of Virtual Fibre Channel F Ports 481-489, each of which is associated with at least one of the Fibre Channel Ports 472-474. As shown in FIG. 4, the Virtual Fibre Channel F Port 481 is associated with the Fibre Channel Port 472, and the Virtual Fibre Channel F Port 489 is associated with the Fibre Channel Port 474. Although not shown in FIG. 4, any of the Fibre Channel Ports 472-474 can be associated with any of the Virtual Fibre Channel F Ports 481-489 at any given point in time. For example, the Fibre Channel Port 473 can be associated with the Virtual Fibre Channel F Ports 483 and 487 at a first time, and associated with the Virtual Fibre Channel F Ports 482, 485 and 486 at a second time.

In some embodiments, the one or more associations between the Fibre Channel Ports 472-474 and the Virtual Fibre Channel F Ports 481-489 can be reconfigured and/or redefined by the Fibre Channel Switch 430 at any point. For example, the Fibre Channel Switch 430 can redefine one or more associations between one or more of the Fibre Channel Ports 472-474 and one or more of the Virtual Fibre Channel F Ports 481-489 to ensure continued connectivity between, for example, a Virtual Fibre Channel N Port from the Virtual Fibre Channel N Ports 433-435, 443-445 and 453-455, and a Virtual Fibre Channel F Port from the Virtual Fibre Channel F Ports 481-489. For example, when the Gateway Device 410 initially assigns a destination MAC address for a particular virtual Fibre Channel N Port from the Virtual Fibre Channel N Ports 433-435, the Fibre Channel Switch 430 can redefine one or more associations between the Fibre Channel Ports 472-474 and one or more of the Virtual Fibre Channel F Ports 481-489. This allows the Virtual Fibre Channel N Port 433-435, 443-445, 453-455 corresponding to the assigned destination MAC address to have connectivity to the appropriate Fibre Channel ports 472-474 and Virtual Fibre Channel F Ports 481-489.

The Peripheral Processing Devices 422-424 are operatively and/or physically coupled to the Gateway Device 410 via the FCoE Ports 432, 442 and 452, respectively. The FCoE Ports 432, 442 and 452 are operatively coupled to the Virtual Fibre Channel N Ports 433-435, 443-445 and 453-455, respectively. Each of the Virtual Fibre Channel N Ports 433-435, 443-445 and 453-455 is uniquely and operatively coupled to one of the Virtual Fibre Channel F Ports 481-489 instantiated at the Fibre Channel Switch 430. In some embodiments, each of the above-described elements shown in FIG. 4 can be substantially similar to the like-named element(s) shown and described in connection with FIG. 1 above.

In some embodiments, each of the FCoE Ports 432, 442 and 452 can receive a Fibre Channel login request from one of the Virtual Fibre Channel N Ports 433-435, 443-445 and 453-455, respectively, and send one or more signals to the Gateway Device 410. For example, as shown in FIG. 4, the FCoE Port 432 of the Peripheral Processing Device 422 can receive a Fibre Channel login request, such as a Fabric Login (FLOGI) or Fabric Discovery (FDISC) request, from the Virtual Fibre Channel N Port 433 and send, to the Gateway Device 410, a Signal 461 including an FIP request based on the Fibre channel login request. The FIP request can be, for example, an FIP FLOGI or FIP FDISC request configured to request assignment of an FCID and/or MAC address to the Virtual Fibre Channel N Port 433 (i.e., the virtual Fibre Channel N Port at which the FIP request originated). In some embodiments, the FIP request can include a MAC-address-assignment method requested by the Virtual Fibre Channel N Port 433, such as Fabric Provided MAC Address (FPMA) or Switch Provided MAC Address (SPMA).

As shown in FIG. 4, the Gateway Device 410 can receive the Signal 461 at the Ethernet Port 412. The Gateway Device 410 can next select, based on a load-balancing calculation, an outbound port, such as a Fibre Channel port from the Fibre Channel Ports 416-418. For example, the Initialization Module 441 of the Gateway Device 410 can determine which Fibre Channel port from the Fibre Channel Ports 416-418 is currently receiving and/or is likely to receive the least amount of network traffic during a preselected period or amount of time. This determination can optionally be based on, for example, one or more network traffic metrics associated with the Gateway Device 410 and the Fibre Channel Ports 416-418. The one or more network traffic metrics can optionally be based on historical and/or predicted network traffic data. In some embodiments, the Gateway Device 410 can perform the load-balancing calculation based on network traffic and/or other information associated with one or more Ethernet ports, FCoE ports and/or Fibre Channel ports operatively coupled to multiple Fibre Channel switches (not shown in FIG. 1). In such embodiments, the Gateway Device 410 can select a Fibre Channel port operatively coupled to a second Fibre Channel switch that is different from the Fibre Channel Switch 430 but likewise operatively coupled to the Fibre Channel Network 440. In such instances, the Gateway Device 410 can perform each of the steps below with respect to the Fibre Channel port operatively coupled to the second Fibre Channel switch.

Having selected an outbound port, the Gateway Device 410 can next send a Signal 462 to the Fibre Channel Switch 430 via the selected outbound port from the Fibre Channel Ports 416-418 (e.g., the Fibre Channel Port 416 as shown in FIG. 4). The Fibre Channel Switch 430 can receive the Signal 462 via the Fibre Channel Port 472. In some embodiments, the Signal 462 can include a Fibre Channel login request based on the FIP request originally included in the Signal 461. More specifically, the Fibre Channel login request can be a Fibre Channel FLOGI or a Fibre Channel FDISC request. Alternatively, the Signal 462 can include a request for an FCID for the Virtual Fibre Channel N Port 433, formatted differently than a Fibre Channel FLOGI or FDISC request.

Upon receiving the Signal 462 (be it a Fibre Channel FLOGI request, a Fibre Channel FDISC request, or other request), the Fibre Channel Switch 430 can define and assign an FCID to the Virtual Fibre Channel N Port 433. Having defined and assigned the FCID to the Virtual Fibre Channel N Port 433, the Fibre Channel Switch 430 can send a Signal 463 to the Gateway Device 410 via the Fibre Channel Port 472. As shown in FIG. 4, the Gateway Device 410 can receive the Signal 463 via the Fibre Channel Port 416. The Signal 463 can be a Fibre Channel login response that includes the FCID assigned to the Virtual Fibre Channel N Port 433. Alternatively, the Signal 463 can be another packet and/or frame type including at least the FCID assigned to the Virtual Fibre Channel N Port 433.

Upon receipt of the Signal 463 including the FCID for the Virtual Fibre Channel N Port 433, the Gateway Device 410 can first define and assign a MAC address to the Virtual Fibre Channel N Port 433. In some embodiments, the MAC address can be referred to as a source MAC address. The assigned/source MAC address can be 48 bits in length, and can be comprised of various component parts, such as an organizationally unique identifier (OUI) and/or the FCID assigned to the Virtual Fibre Channel N Port 433 by the Fibre Channel Switch 430. In some embodiments, the MAC address can alternatively include another FCID assigned to another virtual Fibre Channel N Port from the Virtual Fibre Channel N Ports 434-435 (each of which is instantiated at the Peripheral Processing Device 422).

Having selected the outbound port (e.g., the Fibre Channel port from the Fibre Channel Ports 416-418), the Initialization Module 441 can optionally perform two tasks. First, the Initialization Module 441 can define a destination MAC address associated with that outbound port. In some embodiments, the destination MAC address can initially be associated with each outbound port of the Gateway Device 410 (e.g., each of the Fibre Channel Ports 416-418.) In some embodiments, this destination MAC address can be used by the Virtual Fibre Channel N Port 433 when sending one or more FCoE frames and/or Fibre Channel frames (encapsulated within FCoE frames) to the Fibre Channel Switch 430 via the Gateway Device 410. By providing this destination MAC address to the Virtual Fibre Channel N Port 433 along with an instruction that it be included as the destination MAC address in all FCoE frames sent by the Virtual Fibre Channel N Port 433, the Gateway Device 410 can ensure that each FCoE frame received from the Virtual Fibre Channel N Port 433 will include the defined destination MAC address.

Second, the Initialization Module 441 can define a mapping between the selected outbound port (e.g., the Fibre Channel Port 416) and the Virtual Fibre Channel N Port 433. Based on the defined MAC address and the defined mapping, the Gateway Device 410 can define a switching policy configured to direct and/or allow the Gateway Device 410 to determine whether a received FCoE frame includes the destination MAC address. If the Gateway Device 410 determines that the received FCoE frame includes the destination MAC address, switching policy can direct and/or allow the Gateway Device 410 to forward the FCoE frame and/or a Fibre Channel frame encapsulated therein from an ingress/receiving Ethernet port (e.g., Ethernet Port 412) to the selected outbound (egress) port (e.g., the Fibre Channel Port 416), for transmission to the Fibre Channel Switch 430. (In some embodiments, the switching policy can include a virtual local area network (VLAN) identifier sufficient to define a VLAN (not shown) to which the Virtual Fibre Channel N Port 433 has logged in.) In this manner, the Gateway Device 410 can determine to which Fibre Channel Port 416-418 each received FCoE frame should be forwarded before transmission of the encapsulated Fibre Channel frame to the Fibre Channel Switch 430. In some embodiments, this determination can be made by use of a single filter—thus minimizing occupancy of filter storage space and balancing FCoE traffic across the FCoE Ports 412-414 and the Fibre Channel Ports 416-418. Additional details related to switching policy consolidation and minimization, and to the switching of FCoE frames via a preselected Fibre Channel port based on a destination MAC address are described in co-pending U.S. patent application Ser. No. 12/976,212, entitled "Methods and Apparatus to Route Fibre Channel Frames Using Reduced Forwarding State on an FCoE-to-FC Gateway," filed on even date herewith, which is incorporated herein by reference in its entirety.

Having selected the Fibre Channel port 416-418 and defined the destination MAC address and mapping as described above, the Gateway Device 410 can send, to the Virtual Fibre Channel N Port 433, a response including the destination MAC address, the MAC address assigned to the Virtual Fibre Channel N Port 433 (i.e., the source MAC address) and the assigned FCID. In some embodiments, the response can be or can be similar to an FIP response. More specifically, the Gateway Device 410 can send a Signal 464 via the Ethernet Port 412 and the FCoE Port 432. In some embodiments, the Signal 464 can be an FCoE frame including the response. The Signal 464 can be received at the FCoE Port 432. Upon arrival at the FCoE Port 432, a frame formatter module (not shown in FIG. 4) instantiated at the Peripheral Processing Device 422 can remove the FCoE header from the Signal 464 and send, to the Virtual Fibre Channel N Port 433, a signal including the destination MAC address, the assigned MAC address (i.e., source MAC address) and/or the assigned FCID.

Figure 5:
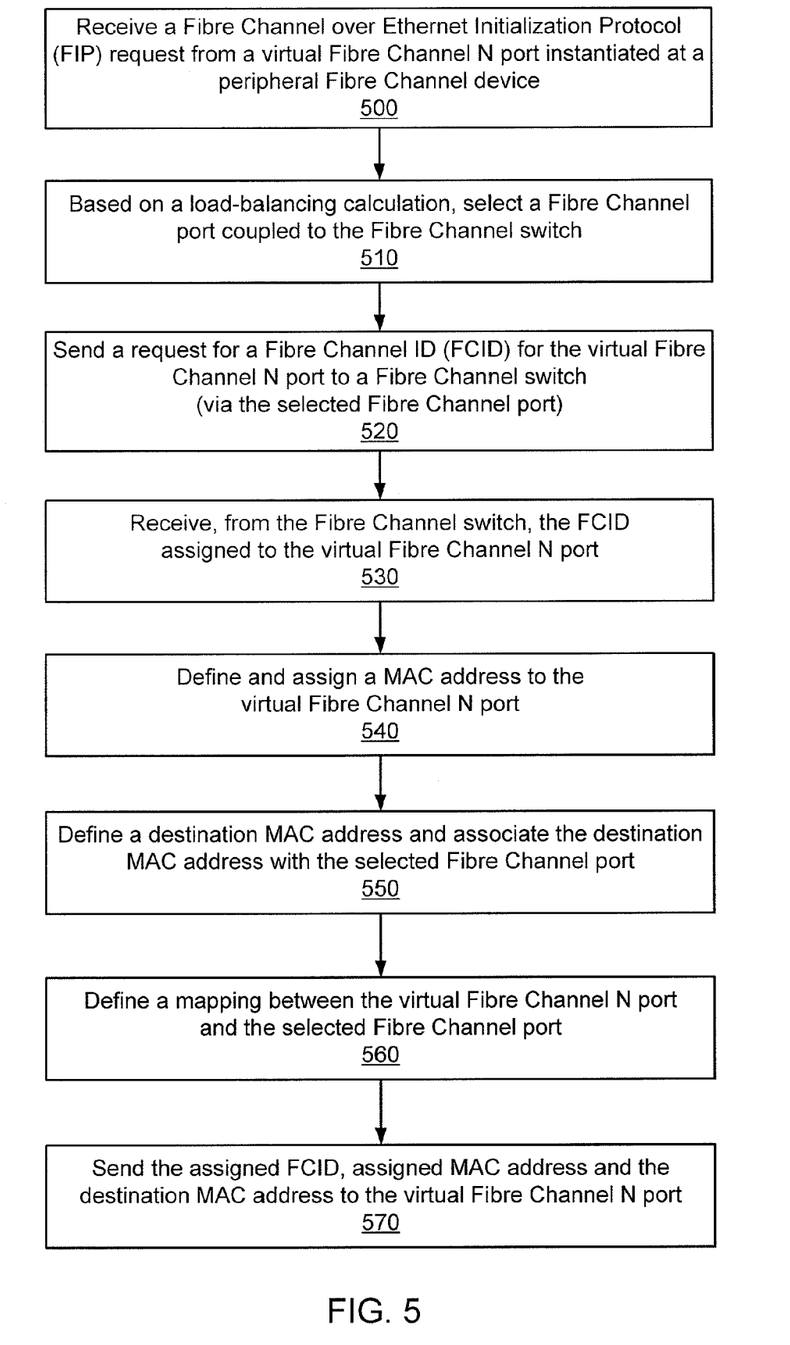
FIG. 5 is a flow chart that illustrates a method of defining a destination MAC address, associating the destination MAC address with a Fibre Channel port, defining a mapping between an ingress Ethernet port and the Fibre Channel port and sending the destination MAC address to a Fibre Channel end node, according to another embodiment.
Figure 6:
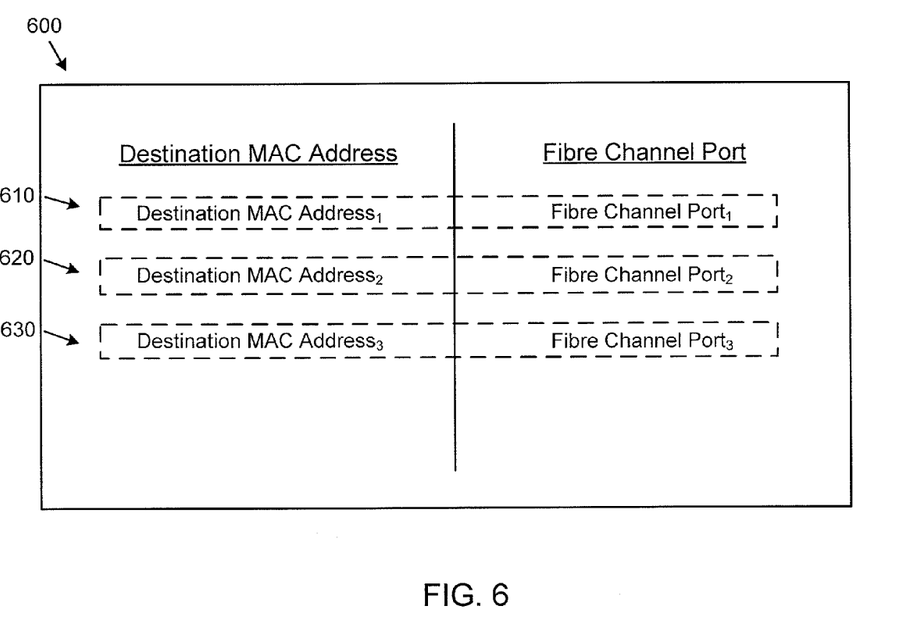

FIG. 5 is a flow chart that illustrates a method of defining a destination MAC address, associating the destination MAC address with an egress Fibre Channel port, defining a mapping between a virtual Fibre Channel N port and the egress Fibre Channel port and sending the destination MAC address to the virtual Fibre Channel N port, according to another embodiment.

An FCoE-to-Fibre Channel gateway ("FCoE gateway") can receive an FIP request from a virtual Fibre Channel N port instantiated at a Fibre Channel device, at 500. In some embodiments, the FCoE gateway can be any gateway device capable of receiving and sending both FCoE and Fibre Channel frames. In some embodiments, the FCoE gateway can optionally be any hardware-based module and/or software-based module (executing in hardware) configured to receive and/or send both FCoE and Fibre Channel frames. The FCoE gateway can optionally include switching and/or routing functionality and can be similar to the Gateway Device 110 discussed in connection with FIG. 1 above. The Fibre Channel device can be a Fibre Channel peripheral processing device. The virtual Fibre Channel N port can be a virtual Fibre Channel N port (e.g., any of the Virtual Fibre Channel N Ports 153-155, 163-165 and 173-175 discussed in connection with FIG. 1 above).

In some embodiments, the FCoE gateway can receive the FIP request from a Fibre Channel peripheral processing device. The FIP request can optionally be included in one or more FCoE frames. The FIP request can be, for example, an FIP FLOGI and/or Fabric Discovery (FDISC) request configured to request an FCID and/or a MAC address for a virtual Fibre Channel N port instantiated at the Fibre Channel peripheral processing device.

The FCoE gateway can next select a Fibre Channel port coupled to the Fibre Channel switch, 510. The FCoE gateway can select a Fibre Channel port based on a load-balancing calculation configured to determine which Fibre Channel port of the FCoE gateway has received and/or is likely to receive the least network traffic during a preselected and/or calculated time period or duration. In this manner, the FCoE gateway can select a Fibre Channel port such that increased network traffic to that Fibre Channel port will result in improved balancing of data exchange across the set of Fibre Channel ports of the FCoE gateway.

The FCoE gateway can send a request for an FCID for the virtual Fibre Channel N port to a Fibre Channel switch (via the selected Fibre Channel port), 520. In some embodiments, the Fibre Channel switch can be any standard Fibre Channel switch, such as the Fibre Channel Switch 300 discussed in connection with FIG. 3 above and/or the Fibre Channel Switch 430 discussed in connection with FIG. 4 above. The request for the FCID for the virtual Fibre Channel N port can optionally be or be included in a Fibre Channel login (i.e., Fibre Channel FLOGI or Fibre Channel FDISC request. In some embodiments, the request can be comprised of one or more Fibre Channel frames.

The FCoE gateway can receive, from the Fibre Channel switch, the assigned FCID for the virtual Fibre Channel N port, 530. More specifically, the FCoE gateway can receive, from the Fibre Channel switch, a response to the Fibre Channel login request described in connection with step 520 above. The response can include an FCID assigned to the virtual Fibre Channel N port. The FCID can be defined based at least in part on a domain ID and/or an area ID associated with the Fibre Channel switch. The FCID can be further defined based at least in part on a port ID associated with a particular Fibre Channel port from the Fibre Channel ports of the Fibre Channel switch. In some embodiments, the FCID can be a 24-bit string including an 8-bit domain ID, followed by an 8-bit area ID, followed by an 8-bit port ID.

Having received the FCID assigned to the virtual Fibre Channel N port, the FCoE gateway can next define and assign a MAC address to the virtual Fibre Channel N port, 540. The MAC address can be defined according to, for example, the FPMA protocol and/or as described in connection with FIG. 4 above. The FCoE gateway can define a destination MAC address and associate the destination MAC address with the selected Fibre Channel port, 550. In some embodiments, the FCoE gateway can define a destination MAC address according to the SPMA or FPMA protocol. The destination MAC address can be, for example, a 48-bit string of bits. To associate the destination MAC address with the selected Fibre Channel port, the FCoE gateway can, for example, define a record, such as a database record and/or file, indicating a relationship between the destination MAC address and the Fibre Channel port.

The FCoE gateway can define a mapping between the virtual Fibre Channel N port and the selected outbound (egress) Fibre Channel port, 560. More specifically, the FCoE gateway can define a record, such as a database record and/or file, indicating a relationship between the virtual Fibre Channel N port and the selected outbound Fibre Channel port. In this manner, the FCoE gateway can specify or allow that each Fibre Channel frame encapsulated in a received FCoE frame that includes the destination MAC address be forwarded to the selected outbound Fibre Channel port. Additional details related to switching policies based on a destination MAC address and an associated Fibre Channel port are described in co-pending U.S. patent application Ser. No. 12/976,212, entitled "Methods and Apparatus to Route Fibre Channel Frames Using Reduced Forwarding State on an FCoE-to-FC Gateway," filed on even date herewith, which is incorporated herein by reference in its entirety.

The FCoE gateway can send the assigned FCID, the assigned MAC address and the destination MAC address to the virtual Fibre Channel N port via the Fibre Channel device, 570. In some embodiments, the FCoE gateway can send, to the Fibre Channel device, a signal including the assigned FCID, the assigned MAC address for the virtual Fibre Channel N port and the destination MAC address. The signal can optionally include an FIP response, and can be configured to indicate to the virtual Fibre Channel N port that it should include the destination MAC address within the FCoE header of all FCoE frames intended for transmission to the Fibre Channel switch (via the FCoE gateway).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in foam and details may be made. Any portion of the apparatus and/or methods described herein may be combined in any combination, except mutually exclusive combinations. The embodiments described herein can include various combinations and/or sub-combinations of the functions, components, and/or features of the different embodiments described. For example, in some embodiments an access switch and a peripheral processing device in a switch fabric can be included in a single hardware device or module.

What is claimed is:

1. An apparatus, comprising:
an inbound Ethernet port at a gateway; and
an initialization module implemented in at least one of a processor or a memory at the gateway and operatively coupled to the inbound Ethernet port, the initialization module configured to receive a Fibre Channel over Ethernet Initialization Protocol (FIP) login request from a network device on the inbound Ethernet port of the gateway,
the initialization module configured to select a Fibre Channel port of the gateway from a plurality of Fibre Channel ports of the gateway based at least in part on a load-balancing calculation, each Fibre Channel port of the plurality of Fibre Channel ports of the gateway not being a virtual port, the initialization module configured to define a destination Media Access Control (MAC) address, the initialization module configured to define a mapping between a virtual Fibre Channel N port of the network device and the Fibre Channel port of the gateway such that the gateway is configured to define a switching policy for the inbound Ethernet port of the gateway and the Fibre Channel port of the gateway, the initialization module configured to associate the destination MAC address with the Fibre Channel port of the gateway such that the gateway is configured to send out a data frame including the destination MAC address via the Fibre Channel port of the gateway based on the association between the destination MAC address and the Fibre Channel port of the gateway and based on the switching policy for the inbound Ethernet port of the gateway and the Fibre Channel port of the gateway, the initialization module configured to send, to the network device, a signal including the destination MAC address in response to the FIP login request.

2. The apparatus of claim 1, wherein the initialization module is coupled to the plurality of Fibre Channel ports of the gateway, the Fibre Channel port of the gateway being operatively coupled to a Fibre Channel switch.

3. The apparatus of claim 1, wherein the Fibre Channel port of the gateway is configured to send, to a Fibre Channel switch, a Fibre Channel fabric login request based at least in part on the FIP login request.

4. The apparatus of claim 1, wherein the initialization module is configured to receive, from a Fibre Channel switch, a signal including a Fibre Channel ID (FCID) assigned to a virtual N-port instantiated at the network device.

5. The apparatus of claim 1, wherein the signal includes a source MAC address assigned to a virtual N-port instantiated at the network device.

6. The apparatus of claim 1, wherein the load-balancing calculation is based at least in part on (1) an amount of network traffic received at the apparatus during a specified time period, and (2) a quantity of Fibre Channel ports from the plurality of Fibre Channel ports of the gateway.

7. The apparatus of claim 1, wherein the network device is a first network device and the initialization module is configured to send, to a second network device operatively coupled to the initialization module and different from the first network device, a signal including the destination MAC address.

8. A system, comprising:
a gateway having a processor configured to define a source Media Access Control (MAC) address and assign the source MAC address to a virtual Fibre Channel N-port instantiated at a network device, and
a Fibre Channel port of the gateway configured to send and receive Fibre Channel traffic and Fibre Channel over Ethernet (FCoE) traffic, the Fibre Channel port of the gateway not being a virtual port,
the processor configured to be operatively coupled to the network device and a Fibre Channel switch, the processor configured to define a destination MAC address and associate the destination MAC address with the Fibre Channel port of the gateway, the processor configured to define a switching policy for an inbound Ethernet port of the gateway and the Fibre Channel port of the gateway based on a mapping between the virtual Fibre Channel N-port of the network device and the Fibre Channel port of the gateway, the Fibre Channel port of the gateway configured to send a data frame including the destination MAC address to the Fibre Channel switch based on the association between the destination MAC address and the Fibre Channel port of the gateway and based on the switching policy for the inbound Ethernet port of the gateway and the Fibre Channel port of the gateway, the Fibre Channel port of the gateway configured to send, to the network device, a signal including the destination MAC address and the source MAC address.

9. The system of claim 8, wherein the Fibre Channel port of the gateway is operatively coupled to a Fibre Channel port of the Fibre Channel switch.

10. The system of claim 8, wherein the processor is configured to define a record associating the destination MAC address and an identifier of the Fibre Channel port of the gateway.

11. The system of claim 8, wherein the processor is configured to select the Fibre Channel port of the gateway from a plurality of Fibre Channel ports of the gateway based at least in part on an amount of network traffic received at the gateway during a specified amount of time.

12. The system of claim 8, wherein the gateway is configured to be coupled to a plurality of network devices including the network device, and the processor is configured to select the Fibre Channel port of the gateway from a plurality of Fibre Channel ports of the gateway based at least in part on an amount of network traffic received at the gateway from each network device from the plurality of network devices.

13. The system of claim 8, wherein the signal includes an indication that the destination MAC address is associated with the Fibre Channel switch.

14. An apparatus, comprising:
a plurality of Fibre Channel ports of a device, each Fibre Channel port of the plurality of Fibre Channel ports of the device not being a virtual port; and
an initialization module implemented in at least one of a processor or a memory at the device, the initialization module configured to define a plurality of destination Media Access Control (MAC) addresses, each destination MAC address from the plurality of destination MAC addresses being uniquely associated with a Fibre Channel port from the plurality of Fibre Channel ports of the device configured to be operatively coupled to a Fibre Channel switch,
the initialization module configured to define a mapping between each source identifier from a plurality of source identifiers and each Fibre Channel port of the device from the plurality of Fibre Channel ports of the device such that a device is configured to define a switching policy for an ingress Ethernet port of the device and the Fibre Channel port of the device,
the initialization module configured to send, to each network device from a plurality of network devices, a signal including a unique destination MAC address from the plurality of destination MAC addresses and a unique source identifier from the plurality of source identifiers of the device based in part on the switching policy for the source identifier and the Fibre Channel port,
each source identifier from the plurality of source identifiers being uniquely associated with a virtual Fibre Channel N port instantiated at a network device from the plurality of network devices.

15. The apparatus of claim 14, wherein the device is an FCoE-to-Fibre Channel gateway device.

16. The apparatus of claim 14, wherein the initialization module is configured to define the plurality of destination MAC addresses based at least in part on a plurality of Fibre Channel IDs (FCIDs), each FCID from the plurality of FCIDs being received from the Fibre Channel switch.

17. The apparatus of claim 14, wherein the initialization module defines a plurality of records, each record from the plurality of records including a destination MAC address from the plurality of destination MAC addresses and an identifier of a Fibre Channel port of the device from the plurality of Fibre Channel ports of the device with which that destination MAC address is associated.

18. The apparatus of claim 14, wherein the initialization module receives each source identifier from the plurality of source identifiers from the Fibre Channel switch.

19. The apparatus of claim 14, wherein the initialization module defines each destination MAC address from the plurality of destination MAC addresses based at least in part on an Organizationally Unique Identifier (OUI) associated with the Fibre Channel switch.

20. An apparatus, comprising:
   an inbound Ethernet port at a gateway; and
   an initialization module implemented in at least one of a processor or a memory at the gateway and operatively coupled to the inbound Ethernet port, the initialization module configured to receive a Fibre Channel over Ethernet Initialization Protocol (FIP) login request from a network device on the inbound Ethernet port of the gateway,
   the initialization module configured to select an outbound Fibre Channel port of the gateway from a plurality of outbound Fibre Channel ports of the gateway based at least in part on a load-balancing calculation, each outbound Fibre Channel port of the plurality of outbound Fibre Channel ports of the gateway not being a virtual port,
   the initialization module configured to define a destination Media Access Control (MAC) address, the initialization module configured to define a mapping between the inbound Ethernet port of the gateway and the outbound Fibre Channel port of the gateway such that the gateway is configured to define a switching policy for the inbound Ethernet port of the gateway and the outbound Fibre Channel port of the gateway, the initialization module configured to associate the destination MAC address with the outbound Fibre Channel port of the gateway such that the gateway is configured to send out a data frame including the destination MAC address via the outbound Fibre Channel port of the gateway based on the association between the destination MAC address and the outbound Fibre Channel port of the gateway and based on the switching policy for the inbound Ethernet port of the gateway and the outbound Fibre Channel port of the gateway,
   the initialization module configured to send, to the network device, a signal including the destination MAC address in response to the FIP login request,
   the initialization module configured to send a request for a Fibre Channel ID (FCID) to a Fibre Channel switch, and receive, from the Fibre Channel switch, a signal including the FCID assigned to a virtual Fibre Channel N-port instantiated at the network device.

* * * * *